(No Model.)
W. H. WESTON.
VEHICLE.
No. 387,838. Patented Aug. 14, 1888.
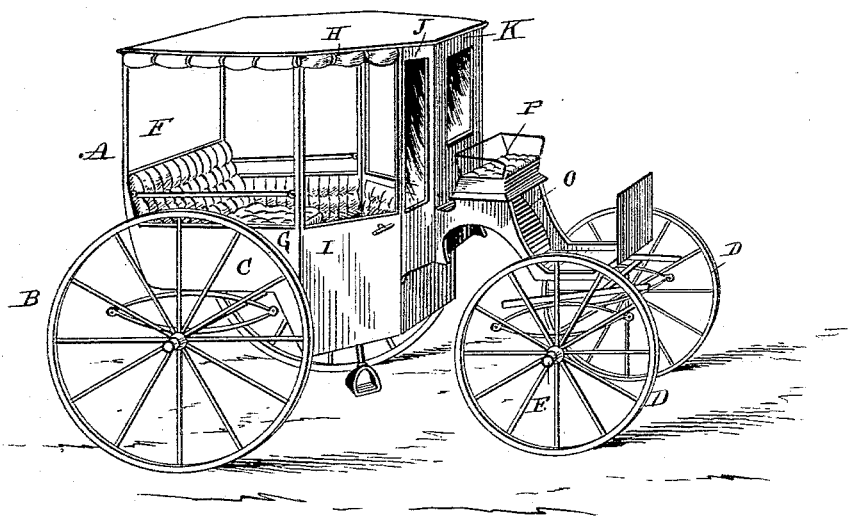
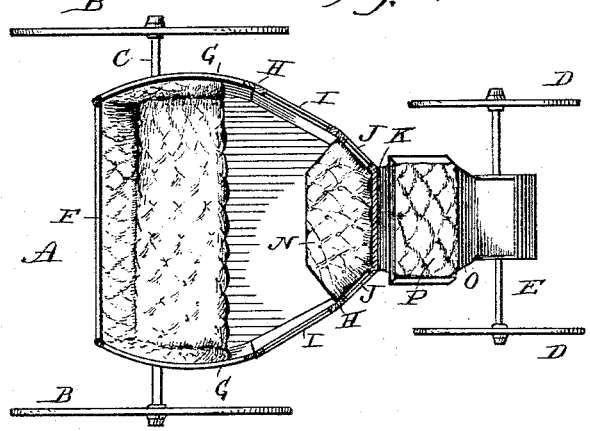
WITNESSES:
INVENTOR,
W. H. Weston,
BY Munn & Co.
ATTORNEY.
N. PETERS, Photo-Lithographer, Washington, D. C.

UNITED STATES PATENT OFFICE.

WILBUR H. WESTON, OF NEWBURG, NEW YORK.

VEHICLE.

SPECIFICATION forming part of Letters Patent No. 387,838, dated August 14, 1888.

Application filed April 3, 1888. Serial No. 269,413. (No model.)

*To all whom it may concern:*

Be it known that I, WILBUR H. WESTON, of Newburg, in the county of Orange and State of New York, have invented a new and Improved Vehicle, of which the following is a full, clear, and exact description.

The invention relates to four-wheeled vehicles, such as carriages, cabs, landaus, &c.

The object of the invention is to provide a new and improved vehicle which is simple, durable, and light in construction, permitting an easy ingress and egress without danger of soiling the dress on the carriage-wheels.

The invention consists of a carriage-body having the front part of its sides inclined inward, and doors fitted on the inclined parts of the said sides.

The invention also consists of certain parts and details and combinations of the same, as will be fully described hereinafter, and then pointed out in the claims.

Reference is to be had to the accompanying drawings, forming a part of this specification, in which similar letters of reference indicate corresponding parts in both the figures.

Figure 1 is a perspective view of the improvement, and Fig. 2 is a sectional plan view of the same.

The improved vehicle A is provided with the usual rear wheels, B, mounted to rotate on the axle C, and with the front wheels, D, mounted to rotate on the axle E. The gage of the front wheels, D, is considerably narrower than the gage of the rear wheels, B, as is plainly shown in the drawings. The wheels B and D support the carriage-body F, provided with the sides G G, having at their fronts the inclined parts H, extending inward, so as to stand diagonally in relation to the rear axle, C, and the longitudinal axis of the carriage-body F.

On the inclined parts of the sides G are fitted the doors I, provided with the usual glass windows, if desired, and having their hinges at the rear ends, so that when the doors are open they swing toward the respective rear wheels, B, and the party desiring to get into or out of the carriage enters or gets out diagonally of the same. From each door I extends a short incline, J, preferably provided with glass, and connected with the front end, K, of the carriage-body F. This front part, K, is connected in the usual manner by the box O with the front axle, E, and carries the driver's seat P.

In the carriage-body F is held the usual rear double seat, L, and the front seat, N, is formed between the inclined sides J and the front end, K, as is plainly shown in Fig. 2. This seat N is preferably hinged to the front end, K, so as to be swung up out of the way whenever desired.

It will be seen that when the door I is opened a considerable space is left for the party to enter, as the front wheels, D, are of narrow gage, and consequently do not obstruct the ingress to or egress from the carriage-body F. It will further be seen that the narrow-gage front wheels, D, permit an easy turning of the vehicle.

The parties seated on the rear seat, L, have an unobstructed view to the front through the windows in the side doors, I, and the glass in the sides J.

The vehicle is specially adapted for one horse; but two may be employed, if desired.

Having thus fully described my invention, I claim as new and desire to secure by Letters Patent—

1. In a vehicle of the class described, a carriage-body having the front parts of its sides provided with two inward inclines, a seat located inside the carriage between the inclines, and doors hinged to the rear ends of said inclines, substantially as described.

2. In a vehicle of the class described, a carriage-body having its front parts inclined inwardly, and doors hinged to the rear ends of said inclines, in combination with the rear and front wheels, the latter being of narrower gage than the former, substantially as described.

3. In a vehicle, a carriage body having the front parts of its sides inclined toward the longitudinal axis of the carriage-body and doors fitted on the said inclined parts, in combination with the rear and front wheels supporting the said carriage-body, said front wheels being of narrower gage than said rear wheels, substantially as shown and described.

WILBUR H. WESTON.

Witnesses:
JOHN H. BANCROFT,
GEO. D. SMITH.